Patented Oct. 6, 1953

2,654,752

UNITED STATES PATENT OFFICE 2,654,752

BETA-4-MORPHOLINOETHYL-BENZOATE SALT OF PENICILLIN

Harley W. Rhodehamel, Jr., Indianapolis, Ind., assignor to Eli Lilly and Company, Indianapolis, Ind., a corporation of Indiana No Drawing. Application February 13, 1952, Serial No. 271,447

2 Claims. (Cl. 260—239.1)

This invention relates to a novel penicillin salt and the preparation thereof.

I have discovered that β-4-morpholinoethyl benzoate or its salts can be combined with penicillin or its salts by neutralization or metathetical reactions to form a sparingly soluble penicillin salt, thereby affording a means of precipitating penicillin from solution, and of purifying penicillin. Moreover, the novel penicillin salt can be utilized therapeutically. A prolonged penicillin blood level can be secured upon administering the salt parenterally by methods known to the medical art.

The following examples illustrate the preparation of the novel salt of this invention:

Example 1

To a solution of 3 g. of penicillin (e. g. a commercial mixture of the several penicillins) dissolved in 35 ml. of amyl acetate are added 3 g. of β-4-morpholinoethyl benzoate dissolved in 50 ml. of amyl acetate. The mixture is cooled and stirred occasionally whereupon the β-4-morpholinoethyl benzoate salt of penicillin precipitates. The salt is isolated as by decantation or filtration, and dried in vacuo.

The salt is represented by the following formula in which P represents penicillin:

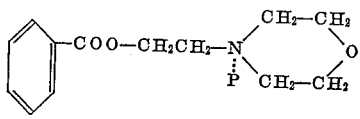

Example 2

To an aqueous solution of 0.3 g. of the potassium salt of penicillin G in 1.8 ml. of water is added a solution of 0.3 g. of β-4-morpholinoethyl benzoate hydrochloride in 5 ml. of water. The mixture is cooled and stirred occasionally whereupon the slightly soluble β-4-morpholinoethyl benzoate salt of penicillin G precipitates. The salt is separated, and dried in vacuo.

β-4-morpholinoethyl benzoate can be prepared by esterification of benzoic acid with β-4-morpholinoethanol. The salts of β-4-morpholinoethyl benzoate are prepared by the usual methods, as by the interreaction of equivalent amounts of the base and a selected acid in inert solvent solution, followed by removal of the solvent.

I claim:

1. The β-4-morpholinoethyl benzoate salt of penicillin represented by the following formula in which P represents penicillin:

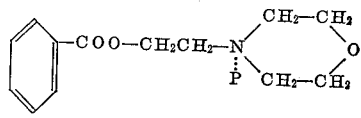

2. The β-4-morpholinoethyl benzoate salt of penicillin G.

HARLEY W. RHODEHAMEL, Jr.

References Cited in the file of this patent

UNITED STATES PATENTS

| Number | Name | Date |
|---|---|---|
| 2,515,898 | Rhodehamel | July 18, 1950 |

FOREIGN PATENTS

| Number | Country | Date |
|---|---|---|
| 659,775 | Great Britain | Oct. 24, 1951 |

OTHER REFERENCES

Ballaro: "Ciencia e Investigacion," vol. 4, November 1948, pp. 481, 482.

Rhodehamel: "J. Am. Chem. Soc.," vol. 73, December 1951, p. 5902.